(12) United States Patent
Berstis

(10) Patent No.: US 6,518,948 B1
(45) Date of Patent: Feb. 11, 2003

(54) MULTICHROMAL TWISTING BALL DISPLAYS

(75) Inventor: Viktors Berstis, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/213,316

(22) Filed: Dec. 16, 1998

(51) Int. Cl.$^7$ .................................................. G09G 3/34
(52) U.S. Cl. ........................ 345/107; 349/117; 359/296; 427/214
(58) Field of Search .............................. 264/4; 345/107, 345/55, 105, 106, 111; 252/62; 340/373; 359/296, 117, 188; 427/214; 349/112, 117

(56) References Cited

U.S. PATENT DOCUMENTS

| | | | |
|---|---|---|---|
| 4,126,854 A | | 11/1978 | Sheridon |
| 4,139,841 A | * | 2/1979 | Roberts .................. 340/815.62 |
| 4,143,103 A | * | 3/1979 | Sheridon ........................ 264/4 |
| 4,769,638 A | * | 9/1988 | Woolfolk .................... 345/111 |
| 5,344,594 A | | 9/1994 | Sheridon |
| 5,659,330 A | | 8/1997 | Sheridon |
| 5,708,525 A | | 1/1998 | Sheridon |
| 5,717,514 A | | 2/1998 | Sheridon |
| 5,717,515 A | | 2/1998 | Sheridon |
| 5,737,115 A | | 4/1998 | Mackinlay et al. |
| 5,739,801 A | | 4/1998 | Sheridon |
| 5,751,268 A | * | 5/1998 | Sheridon ..................... 345/107 |
| 5,767,826 A | | 6/1998 | Sheridon et al. |
| 5,891,479 A | | 4/1999 | Sheridon |
| 5,892,497 A | | 4/1999 | Robertson |
| 5,954,991 A | * | 9/1999 | Hong et al. .............. 252/62.52 |
| 6,262,707 B1 | * | 6/2001 | Sheridon ..................... 345/111 |

FOREIGN PATENT DOCUMENTS

WO     9733267     9/1997

OTHER PUBLICATIONS

Gibbs, W. Wayt, "The Reinvention of Paper", Sep. 1998, pp 36–37.

* cited by examiner

*Primary Examiner*—Dennis-Doon Chow
(74) *Attorney, Agent, or Firm*—Duke W. Yee; Jeffrey S. LaBaw; Stephen R. Tkacs

(57) ABSTRACT

An addressable display device comprising a light transparent body having a plurality of spheroidal balls supported therein. Each ball has an electrical dipole moment and a magnetic dipole moment. An addressing circuit is provided for applying an electric field and a magnetic field across a selected portion of the body to position a given ball. Preferably a given ball is multichromal and includes longitudinal ranges of different colors. A given color within a longitudinal range may include regions of variable saturation as a function of latitude.

18 Claims, 3 Drawing Sheets

MULTICHROMAL TWISTING BALL DISPLAYS

BACKGROUND OF THE INVENTION

1. Technical Field

The present invention relates generally to addressable, reusable, twisting ball displays.

2. Description of the Related Art

A twisting-ball display, also known as a "gyricon," is an addressable display made up of a multiplicity of optically anisotropic balls, each of which can be selectively rotated to present a desired face to an observer. For example, one such display comprises balls each having two distinct hemispheres, one black and the other white, with each hemisphere having a distinct electrical characteristic (e.g., zeta potential with respect to a dielectric fluid) so that the balls are electrically and optically anisotropic. The balls are embedded in a sheet of optically transparent material, such as an elastomer layer, that contains a multiplicity of spheroidal cavities and is permeated by a transparent dielectric fluid, such as a plasticizer. The fluid-filled cavities accommodate the balls, one ball per cavity, to prevent the balls from migrating within the sheet. A ball can be selectively rotated within its respective fluid-filled cavity, for example by application of an electric field, so as to present either the black or the white hemisphere to an observer viewing the surface of the sheet. Thus, by application of an electric field addressable in two dimensions (as by a matrix addressing scheme), the black and white sides of the balls can be caused to appear as the image elements (e.g., pixels or subpixels) of a displayed image.

The above-described twisting ball panel display was first described in U.S. Pat. No. 4,126,854 to Sheridon. The original technology, which was constructed of black-and-white balls, could not provide a multicolor image. As a reult, over the last several decades, there have been several improvements to the original design. Thus, for example, U.S. Pat. Nos. 5,344,594 and 5,708,525 describe a multi-segmented ball useful fox producing a colored display. In these patents, a representative gyricon ball has up to 2N segments n arbitrary color combinations. Black, white, or other color pigments or dyes can be used, alone or in combination, so that segments can be made in different colors or shades. The patent also teaches that segments can be made clear by using unpigmented, undyed plastic liquid, and that different segments can be made to have different widths.

In the prior art, as illustrated in FIGS. 3C–3D of U.S. Pat. No. 5,708,525, the colored segments of a multichromal ball are symmetric around the ball's vertical axis. This symmetry is required because the electric field addressing schemes do not have the capability of positioning the ball longitudinally. As a consequence, any given ball may only include a relatively small number of colors. This significantly limits the flexibility of the overall display. An alternate approach to producing a colored display is to use several balls per pixel to form a given color, such as illustrated in U.S. Pat. No. 5,767,826. The latter approach, however, reduces resolution and complicates manufacturing because the balls must be individually placed.

There remains a need in the art to advance the twisting ball display art to provide a more full range of colored displays and, more particularly, to enhance the control over individual ball elements.

BRIEF SUMMARY OF THE INVENTION

It is an object of the present invention to provide an electrical and magnetic. twisting ball display device made up of spheroidal, multichromal balls.

It is another more particular object to use an field and a magnetic field to control the individual position of a given ball in a twisting ball display. The ball has both an electric dipole and a magnetic dipole.

It is yet another object of this invention to provide a mechanism for selectively positioning a spheroidal ball of a twisting ball display both latitudinally and longitudinally.

Still another object of the present invention is to construct a colored ball display sheet wherein each ball is both an electret and magnet. This permits the application of a combination of electric and magnetic fields to orient a given surface of the ball to a desired position.

A more general object is to provide twisting colored ball displays with higher resolution.

Another object of the present invention is to provide electric paper with individually addressable electret and magnetic balls.

Yet another object of this invention is to provide paper-like digitally addressed media that has various applications including, without limitation, a colored display, a sheet of electric paper, an overlay transparency, or an architectural screen.

It is another object of this invention to a paper-like digitally addressable sheet material that retains a displayed image in the absence of power.

These and other objects are provided in an addressable display device comprising a light transparent body having a plurality of spheroidal balls supported therein, and addressing means for selectively applying an electric field and/or a magnetic field across a selected portion of the body to position a given ball relative to a viewing direction. Preferably, a given ball is multichromal and, in one embodiment, includes at least a first color within a first longitudinal range, and a second color within a second longitudinal range. The color located within a given longitudinal range may have different saturation throughout the range. Thus, for example, the first longitudinal range includes red within a first latitude range thereof and pink within a second latitude range.

A given spheroidal ball has an anisotropy for providing an electrical dipole moment, and an anisotropy for providing a separate magnetic dipole moment. The electrical dipole moment renders the ball electrically responsive such that, when the ball is subjected to an electric field, the ball rotates toward an orientation in which the electric dipole moment aligns with the electric field. Likewise, the magnetic dipole moment renders the ball's magnetic response such that, when the ball is subjected to a magnetic field, the ball rotates to an orientation in which the magnetic dipole moment aligns with the magnetic field. Selective and/or sequential application of the electric field and/or the magnetic field thus serves to position a given region of the ball a particular orientation. The given region typically includes a color. In operation, the ball is selectively rotatable within a transparent body to position a given color with respect to a viewer or light modulating source.

In a preferred embodiment, the addressing means comprises an array of electrical conductors, with each position in the array being associated with a spheroidal ball. The electrical conductors, for example, comprise a set of first, second and third conductors. In one embodiment, the first conductor is positioned on a first surface of the light transparent body along a first direction and includes a coil portion extending therefrom for generating the magnetic field. The second and third conductors are positioned on a second surface of the light transparent body (opposite the first surface) along a second direction transverse to the first direction. These conductors generate the electric field. A pair of diodes connect the coil to the second and third conductors, and the spheroidal ball is preferably located within the confines of the coil. The particular orientation of the ball, both laterally and longitudinally, is determined by given signals applied to the first, second and third electrical conductors.

The foregoing has outlined some of the more pertinent objects and features of the, present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
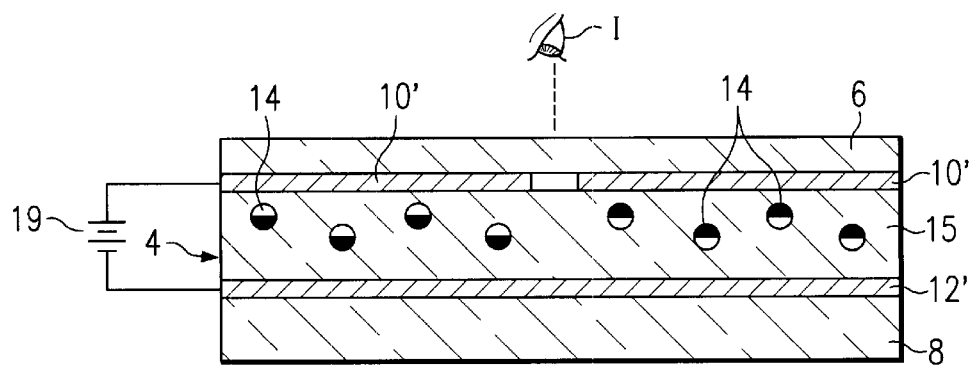
FIG. 1 is a known twisting ball display structure of the prior art.
Figure 2:
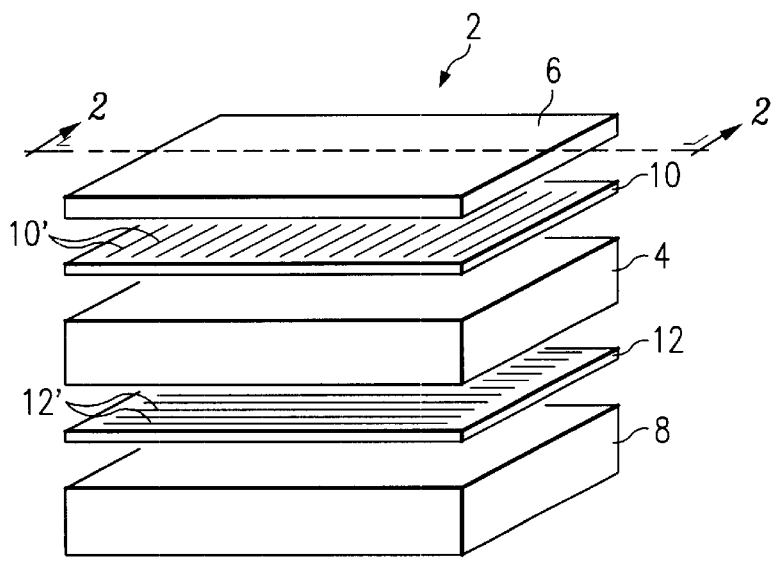
FIG. 2 is an exploded, perspective view of the prior art display structure of FIG. 1 illustrating how the display is made.

FIGS. 1–2 illustrates a known twisting ball display comprising a display panel 4 sandwiched between substrates 6 and 8. Intermediate the display panel 4 and the substrate 6 is a first grid 10 of parallel electrical conductors 10'. A second grid 12, comprising parallel electrical conductors 12', is oriented orthogonally to the first grid 10 between the panel 4 and the substrate 8. At least one of the substrates 6 and 8, and at least the conductors of the grid adjacent that substrate, are optically transparent so that ambient light can impinge upon the display panel 4 and so that the display provided by panel 4 can be viewed. In particular, substrate 6 and conductors 10' are optically transparent so that ambient light incident upon the display provides a visible image to the viewer.

Figure 3:
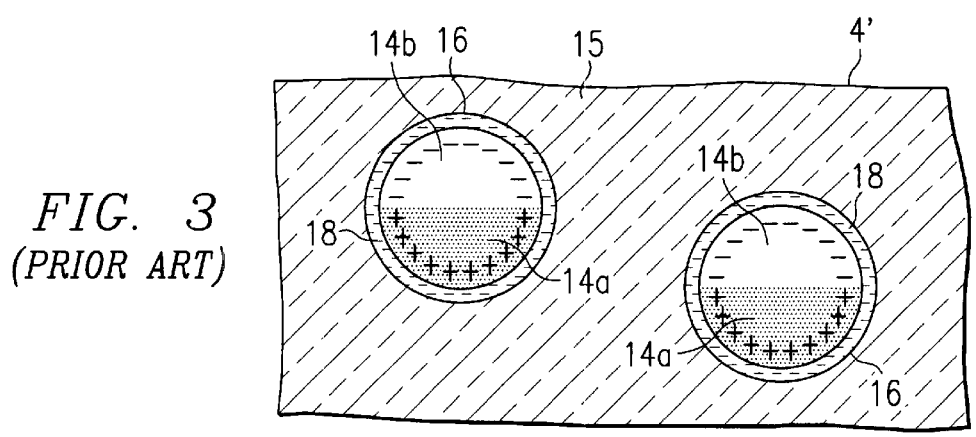
FIG. 3 is an enlargement of a portion of the prior art display of FIG. 1.

Display panel includes a distribution of minute particles, preferably in the form of spheroidal balls, which are optically anisotropic. With reference now also to FIG. 3, each ball is surrounded by a transparent dielectric fluid which, due to the optical anisotropy of the particles and a difference in zeta potential (due to coatings used to achieve the optical anistropy), causes the ball to have an electrical anistropy. The panel 4 includes a solid, optically transparent support material that permits the spheroidal balls to have rotational freedom.

In the basic scheme, the balls are spheres, typically 0.05–0.5 mm., with hemispherical coatings of different zeta potential. The difference in potential may be achieved by applying a coating to one hemisphere 14a that exhibits optical absorption characteristics, and by applying a coating to the other hemisphere 14b that exhibits light reflectance characteristics. The difference between the light reflectance and light absorption characteristics of the two hemispheres provides the desired optical anisotropy. In the illustrative embodiment of U.S. Pat. No. 4,126,854, the balls comprise black polyethylene with a light reflective material e.g., titanium oxide, sputtered on hemisphere 14b.

In operation, a power source 19 (as seen in FIG. 1) is coupled across one of the electrodes 10' of the grid 10 and one of the electrodes 12' of the grid 12. This potential causes the positively charged hemisphere 14a to be attracted to the more negative electrode 12' and the balls within the electric field developed by the energized electrodes 10' and 12' will rotate so that their light reflecting hemispheres 14b are oriented toward the viewer. Thus, a light spot on a dark background is provided. Using conventional matrix addressing, the power source is sequentially and selectively coupled to given points in the array of electrodes 10' and 12' to produce an image.

Figure 4:
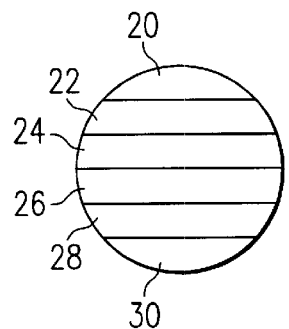
FIG. 4 is a representative multichromal spheroidal ball of the prior art illustrating a series of pigmented bands surrounding the ball.

Bichromal and multichromal spheroidal balls are also known in the prior art. A representative multicolored ball, described in U.S. Pat. No. 5,708,525, is illustrated in FIG. 4 herein. It includes six parallel segments 20, 22, 24, 26, 28 and 30 each of which may be colored. The segments are generally formed by flowing separate pigmented streams through a special nozzle arrangement. As can be seen, each of the segments is continuous around the central axis of the sphere. If this axis is considered oriented along a N-S direction, one of ordinary skill will appreciate that given longitudinal positions within each band are homogenous, i.e. have the same color. Thus, this structure is quite limited in that only a relatively small number of colors may be positioned on the ball's surface.

The present invention solves this problem by using a combination of an electric field and a magnetic field to rotatably position a given spheroidal ball. As such, the spheroidal ball may be considered both an electret and a magnet. In particular, a given spheroidal ball of the present invention has an anisotropy for providing an electrical dipole moment, and an anisotropy for providing a separate magnetic dipole moment. The electrical dipole moment renders the ball electrically responsive such that, when the ball is subjected to an electric field, the ball rotates toward an orientation in which the electric dipole moment aligns with the electric field. Likewise, the magnetic dipole moment renders the ball's magnetic response such that, when the ball is subjected to a magnetic field, the ball rotates to an orientation in which the magnetic dipole moment aligns with the magnetic field. Selective and/or sequential application of the electric field and/or the magnetic field thus serves to position a given region of the ball in a particular orientation. By providing more precis control over the ball's rotation, an individual ball may include a much larger number of colors as compared to the prior art. The resulting display has significantly better resolution and improved display characteristics as compared to the prior art.

Figure 5:
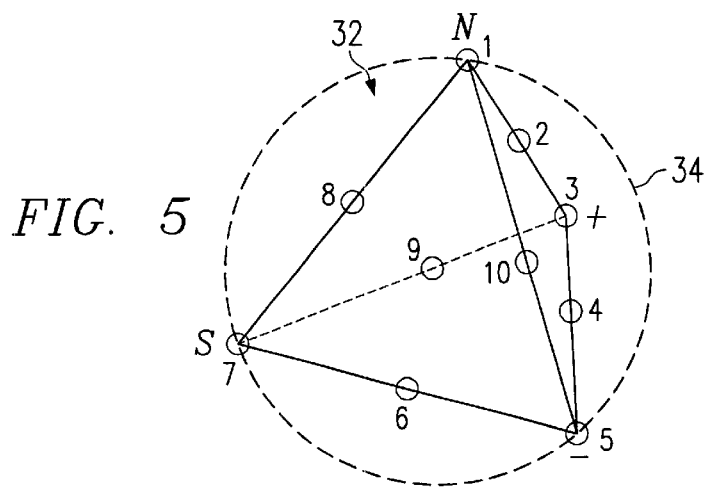
FIG. 5 is a representative sphere in which a tetrahedron is supported to illustrate how a given spheroidal ball of the present invention supports multiple colors.

FIG. 5 is a simplified diagram illustrating a template for a multicolored ball of the present invention. Familiarity with spheroidal geometry is presumed. For convenience only, a tetrahedron 32 is illustrated within the sphere 34. The four (4) points of the tetrahedron (designated N, S, + and −) are illustrating as intersecting the surface of the sphere. The (N,S) dipole represents the magnetic dipole of the ball, and the (+,−) dipole represents the electric dipole of the ball. The magnetic dipole may be formed during manufacture of the ball by mixing fines of a magnetic material (e.g., a permanent magnet or permanent ceramic) into a base material and then applying a magnetic field in a given direction as the ball, following formation, is dropped down a column (and, preferably, prior to cooling). The electric dipole is formed (perhaps at the same time) by applying an electric field in another given direction (again, preferably prior to cooling). Suitable plastic materials are useful as the base material. They include, for example, polyethylene, polyester, carnuba wax, castor wax, epoxy, and the like.

The spheroidal ball, in one illustrative embodiment, includes up to ten (10) different surface regions that are capable of being positioned relative to a view area. In particular, and as illustrated in FIG. 5, each leg of the tetrahedron is bisected by a point halfway along the length thereof. Points (N,S) of the magnetic dipole are numbered 1 and 7, and points (+,−) are numbered 3 and 5, as shown. Point 2 is located halfway between points N and +, substantially as illustrated. Likewise, point 4 is located halfway between points + and − (numbered 3 and 5, respectively), point 6 is located halfway between points − and S (numbered 5 and 7, respectively), point 8 is located halfway between points S and N (numbered 7 and 1, respectively), point 9 is located halfway between points S and + (numbered 7 and 3, respectively), and point 10 is located halfway between points − and N (numbered 5 and 1, respectively).

As will be seen, each of the ten separate points may be brought into a given position. Thus, according to the present invention, the surface area of the sphere surrounding a given point is provided with a given pigment to produce a multi-chromal spheroidal ball. The actual size of the "painted" surface area may vary depending on the number of colored areas on the ball and/or the amount of the ball that is used to create a display image pixel (or subpixel).

Figure 6:
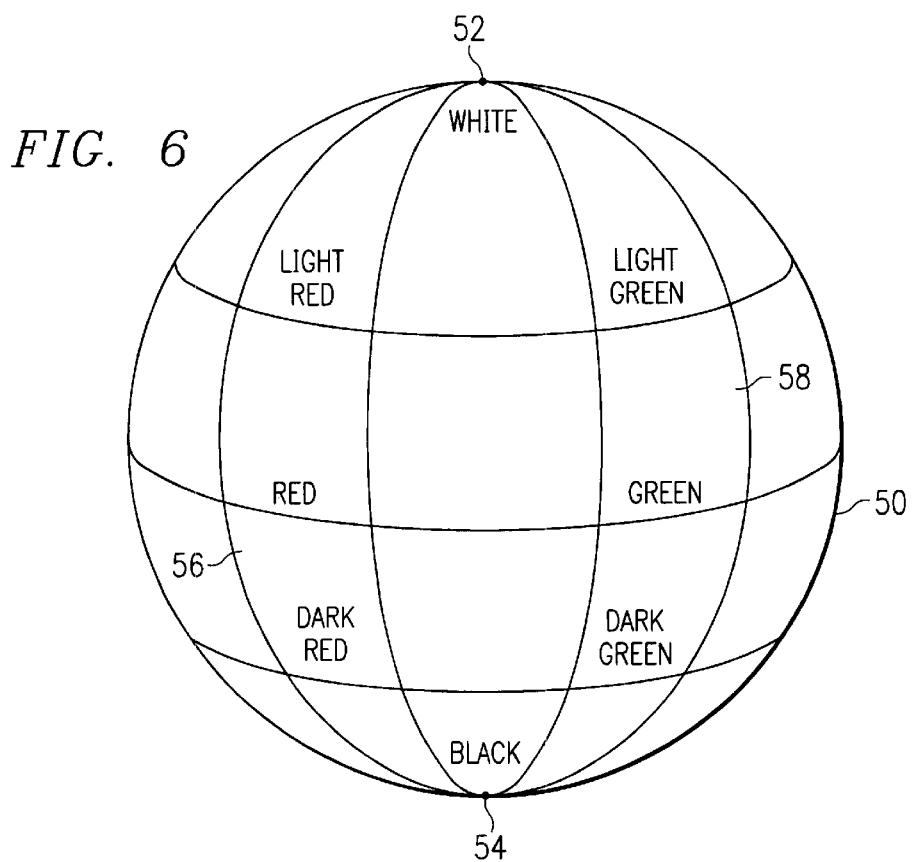
FIG. 6 is a representative multichromal spheroidal ball of the present invention.

The inventive spheroidal ball, unlike the prior art, is not limited to homogenous colored segments about the ball's central axis. In particular, given longitudinal ranges on the ball's surface are different colors, and different latitudinal ranges within a given longitudinal range have different saturation levels. FIG. 6 illustrates a representative spheroidal ball 50 of the present invention. Spheroidal geometry defines a set of longitudinal ranges and a set of latitudinal ranges. For purposes of illustration, the ball 50 has color gradations from white, on the first pole 52, to black, on the antipodal pole 54, with a circle of colors around the equator. Each color or hue is located within a given longitudinal range, and each color has variable saturation within different latitudes of that longitudinal range. Thus, in the illustrative example, one longitudinal range 56 comprises light red (in the northern hemisphere), red (at the equator), and dark red (in the southern hemisphere). Likewise, another longitudinal range 58 comprises light green (in the northern hemisphere), green (at the equator), and dark green (in the southern hemisphere). The rear side (not visible) may include another longitudinal range comprising light blue (in the northern hemisphere), blue (at the equator) and dark blue (in the southern hemisphere). Of course, this color scheme is merely illustrative and should not be taken by way of limitation. A given color may be applied to the surface area by an inkjet during manufacture of a given ball. A set of balls may be colored by driving each ball of the set to a given position and then applying the color simultaneously.

The above-described embodiment of FIG. 6 is not meant to limit the present invention. A given spheroidal ball surface portion may be black; white; clear (i.e., essentially transparent and without chroma); a transparent color (e.g., transparent red, blue, or green, as for certain additive color applications; transparent cyan, magenta, or yellow, as for certain subtractive color applications); an opaque color of any hue, saturation and luminance; any shade of gray, whether opaque or translucent; and so forth.

Figure 7:
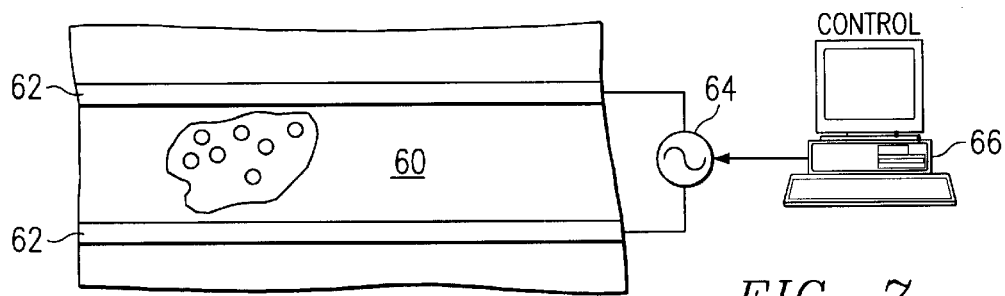
FIG. 7 is a simplified representation of a twisted ball display of the present invention.

FIG. 7 is a representative twisted ball display of the present invention. The display comprises a light transparent body or substrate 60 in which the spheroidal balls are supported in liquid-filled cavities. An addressing array 62 applies electric and magnetic fields across selected portions of the light transparent body so that the balls contained therein rotate to provide a display. A power source 64 drives the addressing array. If desired, the power source 64 is controlled by a computer 66. The same or similar elastomer materials used for the individual balls can be used for the light transparent body, and the liquid-filled cavities of the sheet are preferably formed of a dielectric liquid plasticizer such as silicone oil. Preferably, there is one spheroidal ball per cavity, and each cross-point of the addressing array controls one ball. This is not a limitation of the invention, as more than one ball may be present within a given cross-point of the array.

Figure 8:
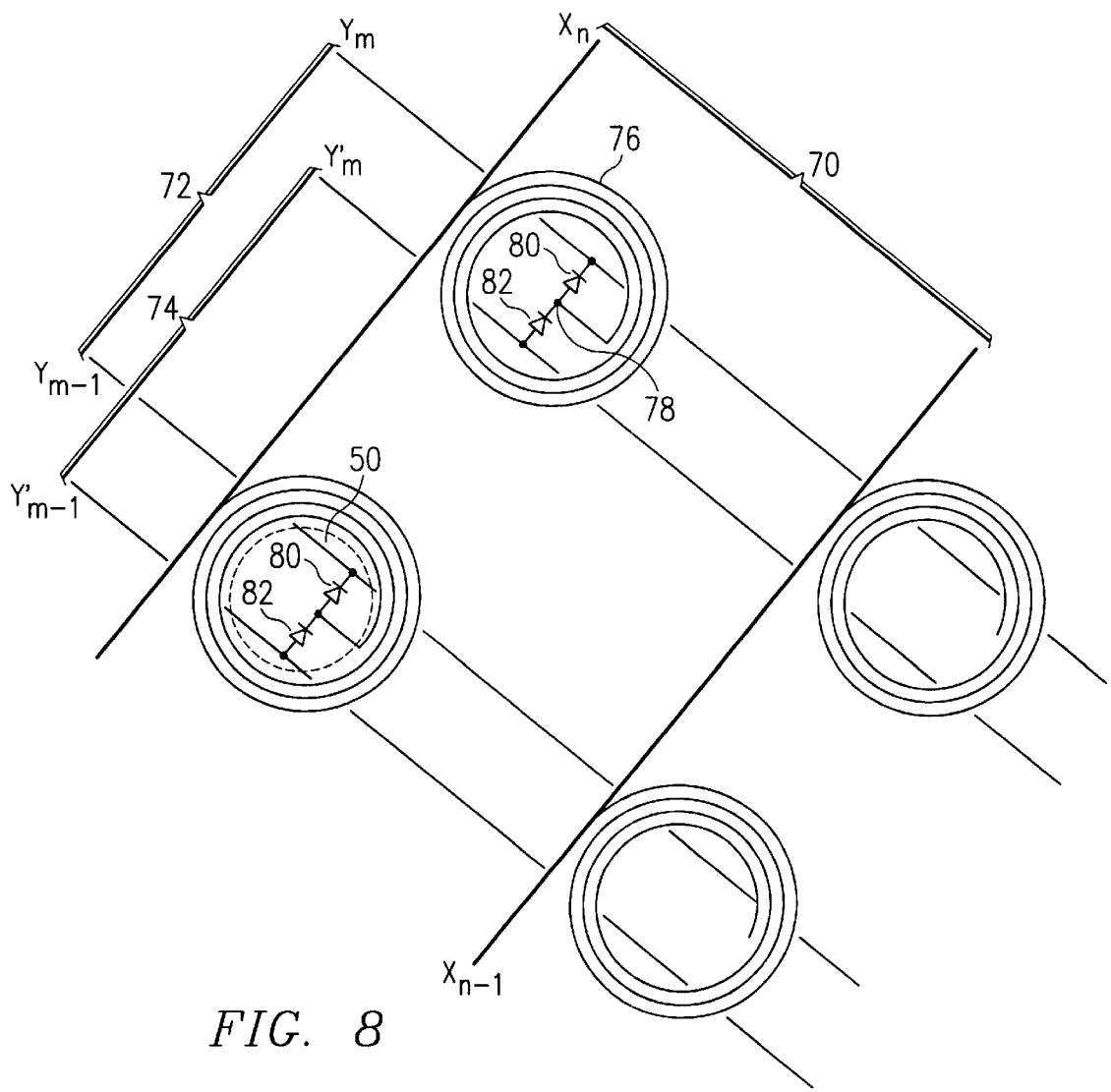
FIG. 8 is a simplified representation of an addressing array for controlling the multichromal spheroidal balls according to the present invention.

FIG. 8 illustrates a representative addressing array for rotatably positioning a spheroid ball at one of ten (10) different positions. One of ordinary skill in the art will appreciate that the same addressing array may be used to position a ball with less than ten (10) colors by taking a subset of the control commands to be described below.

The array comprises first, second and third conductor grids 70, 72 and 74. First conductor grid 70 comprises a set of first conductors $x_n$, $x_{n-1}$, . . . extending in a first direction on a first side of the transparent body. Each first conductor $x_n$ includes a coil portion 76 for producing a magnetic field as will be seen. Coil portion terminates in an end 78. Second conductor grid 72 comprises a set of second conductors $y_m$, $y_{m-1}$, . . . extending in a second direction (orthogonal to the first direction) on a second, opposite side of the transparent body. Third conductor grid 74 comprises a set of second conductors $y'_m$, $y'_{m-1}$, . . . extending in the second direction on the second, opposite side of the transparent body. As can be seen, the conductors of the second and third grids are substantially parallel.

As noted above, at least one spheroidal balls 50 is supported in each cross-point of the array. Preferably, the spheroidal ball 50 within the transparent body is located above the second and third conductors and within the confines of the enveloping coil portion 76, substantially as shown. As also seen, a pair of diodes 80 and 82 is provided at each cross-point in the array. The first diode 80 is connected between the end 78 of the coil 76 and the second conductor $y_m$, and the second diode is connected between the third conductor $y'_m$ and the end 78. As will be seen, the diodes are provided to control the electric and magnetic fields generated by the first, second and third conductors and thereby control the ultimate position of the ball. Although not required, the diodes are supported in the substrate between the first and second sides thereof. Alternatively, arrays 70 and 72 are located on the same side of the transparent body, in which case the diodes need not pass through the body. In the latter case, array 74, which applies the electric charge forces, is still located on the opposite side.

The addressing array provides selective control over the rotational position of a given spheroidal ball. By way of brief background, it is assumed that electrical signals (either positive or negative) may be applied to a given conductor in the array, or that no signal is applied to a given conductor. Using these three (3) conductors, various control forces may be generated. In particular, the reference to + means applying a positive voltage. The reference to − means applying a negative voltage. The reference to x means simply a high impedance, or that no applied drive voltage. With the array of first, second and third electrical conductors, a set of four (4) forces may be applied to a given spheroidal ball, as follows:

| Forces | $x_n$ | $y_m$ | $y_m^1$ |
|---|---|---|---|
| magnetic N | + | − | x |
| magnetic S | − | x | + |
| static + | − | + | x |
| static − | + | x | − |

A given spheroidal ball such as illustrated in FIG. 6 is driven to 1 of 10 different positions using a combination of first and second drive steps, substantially as shown below:

| Orient to position | Step 1 | | | Step 2 | | |
|---|---|---|---|---|---|---|
| | $x_n$ | $y_m$ | $y_m^1$ | $x_n$ | $y_m$ | $y_m^1$ |
| 1 | + | − | x | x | x | x |
| 2 | + | − | x | − | + | x |
| 3 | − | + | x | x | x | x |
| 4 | − | + | x | + | x | − |
| 5 | + | x | − | x | x | x |
| 6 | + | x | − | − | x | + |
| 7 | − | x | + | x | x | x |
| 8 | − | x | + | + | − | x |
| 9 | − | x | + | − | + | x |
| 10 | + | − | x | + | x | − |

The above steps are preferably implemented using the computer, as described above.

The present invention is not limited to a 10-position spheroidal ball as illustrated. Other representative geometries include a 12-position ball (which may be visualized by placing a dodecahedron within a sphere), a 20-position ball (which may be visualized by placing an icosahedron within a sphere), or the like. When additional rotatable positions are required (as would be the case with these more complex geometries), these positions are obtained either by including added pulsing steps or by further granularity in the pulse lengths.

Thus, according to the present invention, the spheroidal balls are constructed to be both an electret and magnet. This permits the application of a combination of electric and magnetic fields to orient the balls. Using the addressable array as disclosed herein, each ball can be rotated in smaller than 180 degree increments by timing the applied signals and controlling their magnitude. If necessary, an extra large charge signal may be provided to stop the ball from rotating. According to the illustrated embodiment of the present invention, the magnetic field is applied to each individual ball using printed coils at each cross-point in the array, however, one of ordinary skill will appreciate that other field generating geometries including a planar field can be used instead. If a planar filed were used, a strong electric field can be applied to each ball when it is oriented properly on the magnetic field rotation axis. Then, the electric field is reduced for the appropriate time to let the ball rotate around the electric field rotation.

The present invention permits higher resolution color images to be displayed as compared to the prior art. Moreover, one of ordinary skill will further appreciate that, by providing enhanced control over the rotational position of each multichromal ball, the balls may be colored in a much simpler fashion as compared to the complex manufacturing techniques used in the prior art. As described above, instead of requiring individual placement of each separately colored balls, the balls may simply be packed homogeneously in a plane and then coated in place.

The present invention has numerous applications, many of which have been described in the art. Thus, in addition to its use as a rigid or fixed flat panel display or a flexible display sheet, the transmissive twisting ball device may be used as electric paper, as an overlay transparency, as an architectural screen (e.g., as an electronic window shade or partition), or in any other light modulating application.

Having thus described my invention, what I claim as new and desire to secure by Letters Patent is set forth in the following claims:

What is claimed is:

1. An addressable display device, comprising:
   a light transparent body having a plurality of spheroidal balls supported therein; and
   addressing means for applying an electric field and a magnetic field across a selected portion of the body to rotationally align a given ball to display a selected longitudinal range of the given ball and a selected latitudinal range within the longitudinal range of the given ball.

2. The addressable display device as described in claim 1 wherein the given ball is multichromal.

3. The addressable display device as described in claim 2 wherein the given ball is a first color within a first longitudinal range, and a second color within a second longitudinal range.

4. The addressable display device as described in claim 3 wherein along a given longitudinal range the first color has a first saturation within a first latitude range and a second saturation within a second latitude range.

5. The addressable display device as described in claim 1 wherein the addressing means comprises an array of electrical conductors, with each cross-point in the array being associated with a spheroidal ball.

6. An addressable display device, comprising:
   a light transparent body having a plurality of spheroidal balls supported therein; and
   addressing means for applying an electric field and a magnetic field across a selected portion of the body to position a given ball, wherein addressing means comprises an array of electrical conductors, with each cross-point in the array being associated with a spheroidal ball, wherein for each cross-point in the array, the electrical conductors comprise:
   a first conductor positioned on a first surface or the light transparent body along a first direction, the first conductor also having a coil portion extending therefrom for generating the magnetic field;
   second and third conductors positioned on a second surface of the light transparent body along a second direction transverse to the first direction for generating the electric field; and means connecting an end of the coil portion to each of the second and third conductors.

7. An addressable display device, comprising:

a light transparent body having a plurality of spheroidal balls supported therein; and addressing means for applying an electric field and a magnetic field across a selected portion of the body to position a given ball, wherein addressing means comprises an array of electrical conductors, with each cross-point in the array being associated with a spheroidal ball, wherein for each cross-point in the array, the electrical conductors comprise:

a first conductor positioned on a first surface of the light transparent body along a first direction, the first conductor also having a coil portion extending therefrom for generating the magnetic field;

second and third conductors positioned on a second surface of the light transparent body along a second direction transverse to the first direction for generating the electric field; and means connecting an end of the coil portion to each of the second and third conductors, wherein the means comprises a first diode connecting the end of the coil portion to the second conductor, and a second diode connecting the third conductor to the end of the coil portion.

8. The addressable display device as described in claim 7 wherein application of a given positive voltage and a given negative voltage to selected ones of the first, second and third conductors generates the electric and magnetic fields used to orient the given ball.

9. A material, comprising:

a light transparent body having a plurality of spheroidal balls supported therein at given positions, wherein each of the spheroidal balls has a set of colors including a first color bounded by a first longitudinal range and a second color bounded by a second longitudinal range, wherein a given color varies in saturation within a given longitudinal range.

10. Apparatus, comprising:

a light transparent body having a plurality of spheroidal balls supported therein at given positions, wherein each of the spheroidal balls has a set of colors located within different longitudinal ranges and wherein the color in at least one longitudinal range has regions of variable saturation; and addressing means for applying an electric field and a magnetic field across a selected portion of the body to orient the balls within the portion to display a given one of the colors.

11. The apparatus as described in claim 10 wherein the addressing means comprises an array of electrical conductors, with each cross-point in the array being associated with a spheroidal ball.

12. The apparatus as described in claim 11 wherein the electrical conductors comprise, at each cross-point in the array:

a first conductor positioned on a first surface of the light transparent body along a first direction, the first conductor also having a coil portion extending therefrom for generating the magnetic field;

second and third conductors positioned on a second surface of the light transparent body along a second direction transverse to the first direction for generating the electric field; and means connecting an end of the coil portion to each of the second and third conductors.

13. Apparatus, comprising:

a light transparent body having a plurality of spheroidal balls supported therein at given positions, wherein each of the spheroidal balls has a set of colors located within different longitudinal ranges and wherein the color in at least one longitudinal range has regions of variable saturation; and addressing means for applying an electric field and a magnetic field across a selected portion of the body to orient the balls within the portion to display a given one of the colors, wherein the addressing means comprises an array of electrical conductors, with each cross-point in the array being associated with a spheroidal ball, wherein the electrical conductors comprise, at each cross-point in the array:

a first conductor positioned on a first surface of the light transparent body along a first direction, the first conductor also having a coil portion extending therefrom for generating the magnetic field;

second and third conductors positioned on a second surface of the light transparent body along a second direction transverse to the first direction for generating the electric field; and means connecting an end of the coil portion to each of the second and third conductors, wherein the means comprises a first diode connecting the end of the coil portion to the second conductor, and a second diode connecting the third conductor to the end of the coil portion.

14. The apparatus as described in claim 13 wherein application of a given positive voltage and a given negative voltage to selected ones of the first, second and third conductors generates the electric and magnetic fields used to orient the given ball.

15. A ball, comprising:

a base material formed into a sphere and having an electric dipole and a magnetic dipole; and at least one colored area positioned on a surface of the sphere wherein the colored area is located within a given longitudinal range on the sphere;

wherein the colored area has regions of variable saturation within the given longitudinal range.

16. The ball as described in claim 15 wherein each region of variable saturation is located within a given latitudinal range.

17. The ball as described in claim 15 wherein a given pole of the sphere is white.

18. The ball as described in claim 15 wherein a pole antipodal to the given pole is black.

* * * * *